United States Patent [19]

Thompson, Jr.

[11] 4,180,419

[45] Dec. 25, 1979

[54] SOLDER FLUX

[75] Inventor: Floyd A. Thompson, Jr., North Carver, Mass.

[73] Assignee: M. W. Dunton Company, Providence, R.I.

[21] Appl. No.: 908,702

[22] Filed: May 23, 1978

[51] Int. Cl.$^2$ .............................................. B23K 35/34
[52] U.S. Cl. ........................................ 148/23; 148/25
[58] Field of Search ...................... 148/22, 23, 26, 24, 148/25

[56] References Cited

U.S. PATENT DOCUMENTS

| Re. 28,472 | 7/1975 | Aronberg | 148/25 |
|---|---|---|---|
| 2,658,846 | 11/1953 | DeRosa | 148/25 |
| 3,597,285 | 8/1971 | Aronberg | 148/26 |
| 3,791,886 | 2/1974 | Goldfarb | 148/23 |
| 3,985,587 | 10/1976 | Choby | 148/23 |

*Primary Examiner*—P. D. Rosenberg
*Attorney, Agent, or Firm*—Barlow & Barlow

[57] ABSTRACT

Water soluble soldering flux compositions, and methods of making same are provided. The compositions contain, as the fluxing agent, an effective amount to cause fluxing, at or below the soldering temperature of the piece to be soldered, of a water-soluble ester of phosphoric acid.

22 Claims, No Drawings

SOLDER FLUX

This invention relates to soldering fluxes, and more particularly to non-corrosive non-acid fluxes useful in such soldering processes as for assembling electrical and electronic components on a printed circuit board.

The principal function of a soldering flux is to remove contamination from a metal surface to provide a clean surface for wetting by molten solder. A number of soldering fluxes known by the electronics industry have disadvantages. For example, pure rosin fluxes which are widely used generally are considered satisfactory for removing only relatively thin oxide film from metal surfaces such as copper, but are relatively ineffective on heavily oxidized metal surfaces. Moreover, post-soldering residues of rosin fluxes generally are water insoluble which may complicate clean up, e.g. by requiring environmentally questionable organic solvents. Another major class of fluxes are the acidic type fluxes which include acids such as hydrochloric acid, citric acid and acetic acid, inorganic chlorides such as zinc chloride and organic compounds such as urea and amine hydrochlorides. While such acidic type soldering fluxes generally exhibit greater activity than rosin fluxes and also may have the advantage of water solubility, extreme care must be taken to substantially completely remove all flux residues since any residues left on the board may subsequently react with moisture in the air and corrode the soldered parts or board circuits. Moreover, acidic flux residues may be electrically conductive and thus give rise to electrical leakage.

It is thus a primary object of the present invention to provide a novel water-soluble flux composition. Another object of the invention is to provide a novel flux composition which leaves water soluble residues which are non-corrosive to metals and which are electrically non-conductive.

Still another object of this invention is to provide a relatively high activity flux composition which contains no acids, chlorides, or rosins. It is also an object of the present invention to provide methods of preparing flux compositions have the foregoing characteristics.

These and other objects of the present invention are achieved by providing a flux composition which comprises (A) an effective amount to cause fluxing, at or below the soldering temperature of the piece to be soldered, of a fluxing agent in the form of an ester of phosphoric acid and (B) a carrier therefore. In a preferred embodiment of the invention the fluxing agent comprises a polyhydric alcohol ester of phosphoric acid. The ester may be formed by mixing approximately stoichmetric amounts of phosphoric acid and the alcohol in water, and heating the mixture to achieve esterification, e.g. in accordance with the teachings of Gleason et al U.S. Pat. No. 3,328,492. The resultant reaction product can be dissolved in a conventional liquid carrier such as aliphatic alcohol, e.g. methanol, propanol, a glycol, e.g. ethylene glycol, or a glycol ether for an external flux, or the reaction product may be incorporated into the hollow core of solder wire. Also, the liquid carrier may comprise water or a solution containing water.

An unusual and interesting feature of the present invention is that flux residues of the present invention, if left on a metal surface, are non-corrosive, and the residues also provide a coating capable of resisting the effects of corrosive atmospheres. Moreover, the flux residues of the present invention are water soluble. This latter feature is believed unique to the present invention since known water soluble fluxes are believed to contain corrosive halogens, halogenated salts, acids or acid salts.

The fluxing agent-carrier compositions of this invention are prepared by blending or dissolving the fluxing agent in a water soluble carrier. For example, if a liquid flux composition is desired, the fluxing agent of the present invention can be dissolved in methanol or isopropanol. If desired a small amount of water may also be added to the composition in known manner in order to raise the boiling point and flash point of the alcohol carrier. A flux composition in paste form can be produced by mixing the fluxing agent of the present invention in a material which is normally capable of being made into a solid or a paste at ambient conditions. For example, the fluxing agent can be dissolved in glycerine, glycol, methyl cellulose, or a polyethylene glycol such as Carbowax 4000 (available from Union Carbide Company, New York, N.Y.). The flux composition made in accordance with the present invention can also be incorporated into a cored solder in known manner.

The flux compositions in accordance with the present invention should contain an amount effective to cause fluxing, of the piece to be soldered, of the ester of phosphoric acid fluxing agent. This effective amount can readily be determined by those skilled in the art by a few simple soldering tests to determine the minimum amount necessary. Any amount above the minimum necessary to cause effective fluxing (for the given oxide film) generally is not necessary and increases the cost of the flux composition without additional benefits during the soldering process. Generally, the water-soluble ester of phosphoric acid fluxing agent will comprise between about 1–20 wt.% of the composition. However, for most applications 1–4% concentration of fluxing agent in a carrier has been found to provide effective fluxing.

In the following examples illustrative of the principals of the present invention, employ a polyhydric alcohol ester of phosphoric acid made in accordance with the teachings of Gleason et al. U.S. Pat. No. 3,328,492, as the fluxing agent.

The basic procedure is to mix phosphoric acid, a selected polyhydric alcohol and water and heat the mixture to effect esterification. For example, the mixture may be heated to 250° F., and heating continued until the mixture changes color, e.g. typically about 10–30 minutes. The reaction product comprises the phosphoric acid ester of the selected polyhydric alcohol. The flux composition is prepared by mixing the resulting reaction product with a suitable water-soluble carrier.

PREPARATION A

Two hundred fifty-five parts by weight of an 85% solution of phosphoric acid is combined with 75 parts by weight of sorbitol and 30 parts by weight water. The mixture is heated to about 250° F., and heating is continued until a change in color of the solution to amber or brown is observed. The resulting product is an amber or brown liquid having a boiling point range of 250°–255° F., specific gravity of 1.489 @ 20° C. and it is completely miscible in water and alcohol, petroleum oil and distillates, and polar solvents.

PREPARATION B

The procedure of Preparation A was followed with the following exception—75 parts by weight of mannitol are substituted for the sorbitol. The reaction is heated as before a change in the color of the solution to light amber is observed.

EXAMPLE I

The purpose of this example is to show how the ester of phosphoric acid produced in accordance with Preparation A may be formed into a flux composition.

(a) Liquid flux—The following are mixed together to form a liquid flux:

3.6 grams of the ester of phosphoric acid of Preparation A
   0.5 grams of Zonal FSN[(1)]
   3.0 grams of polyethelene glycol (MW-300)[(2)]
   92.9 grams isopropanol

[(1)]Available from E. I. duPont de Nemours & Co., Inc. The manufacturer describes this material as a non-ionic fluoro surfactant.
[(2)]Available from Union Carbide Company under the tradename "Carbowax 300".

The resulting mixture is a clear brown tinted solution.

The mixture is tested for removing medium to heavy oxides from a printed circuit board. The solution is applied to the circuit board, and the circuit board is then exposed to a wave soldering operation in known manner. The solution is found to remove effectively the oxides, permitting excellent soldering results to occur. The soldered board is then washed in a conventional water wash, and the board surface is measured for ionic activity. The board averages less than five micrograms per square cm. in ionic residue.

(b) Cored flux—The following were blended together in order to form a flux core:

10 grams of the ester of phosphoric acid of Preparation A
   90 grams polyethelene glycol (MW-4000)[(3)]

[(3)]Available from Union Carbide Company under the tradename "Carbowax 4000".

The procedure is to melt the polyethelene glycol by heating to 150° F. The ester of phosphoric acid is added, and the mixture is stirred vigorously while it cooled to 125° F. From 110° F. it is allowed to cool without stirring. The resulting mixture is then loaded into a conventional solder alloy in known manner.

Electronic components are then soldered onto circuit boards using the resulting cored solder and a soldering iron in known manner. Following soldering the boards are washed with an aqueous solution, and tested for ionic surface activity as before. Average ionic activity is measured as less than three micrograms per square cm.

EXAMPLE II

Example I is repeated with the following change—the fluxing agent is the ester of phosphoric acid prepared in accordance with the Preparation B. Similar results are observed.

EXAMPLE III

The purpose of this Example is to show how residues from flux compositions made in accordance with the present invention react if left on a circuit board. The procedure of Example I is repeated with the following exception—the printed circuit board is not washed following soldering. Surface ionic activity measured immediately following soldering is thirty micrograms per square inch. The circuit board is put into storage and surface ionic activity is measured periodically. After four days storage in a temperature and humidity chamber (per mil STD 202) average ionic residue on the unwashed board is measured as between eight and ten micrograms per square cm.

Results

Ionic activity of flux residues appears to decrease with time. No corrosion or other deterioration in soldered joints can be observed.

As appears from the foregoing, water soluble alcohol esters of phosphoric acid offer unique advantages as flux agents. Moreover, the fact that the flux agents of the present invention are highly active in dilute solution, e.g. 1–4%, provides an advantage that the carrier may provide a substantial heat sink. Thus, the flux agent of the present invention meets the requirements of DIP and HYBRID manufacturers and users. Still another advantage of the flux agent of the present invention is the resistance to carbonization at high temperature.

Certain changes may be made in the above process products without departing from the scope of the invention herein involved. For example, the invention also envisions the incorporation of the flux agent of the present invention dispersed in a paste or cream, with powdered solder, or in a solder pre-form, all as well known in the art. The invention also envisions the addition to the flux compositions of usual wetting agents and dyes. Thus it is intended that all matter in the foregoing description shall be interpreted in an illustrative and not in a limiting sense.

What is claimed is:

1. A composition of fluxing agent with a water soluble carrier wherein the fluxing agent consists essentially of a phosphoric ester which is the reaction product of stochiometric amounts of phosphoric acid and a polyhydric alcohol, the alcohol having a molecular weight of about 200.

2. In a flux according to claim 1 wherein said polyhydric alcohol is selected from the group consisting of sorbitol and mannitol.

3. In a flux according to claim 2 wherein said polyhydric alcohol comprises sorbitol.

4. In a flux according to claim 2 wherein said polyhydric alcohol comprises mannitol.

5. In a flux according to claim 1, wherein said water soluble carrier is selected from the group consisting of water, an alcohol, a glycol and a glycol ester.

6. In a flux according to claim 1 wherein said carrier comprises polyethylene glycol.

7. In a method of manufacturing a soldering flux composition by mixing a fluxing agent in a carrier, the improvement which comprises mixing an effective amount to cause fluxing of the work to be soldered, of an ester of phosphoric acid which consists essentially of the reaction product of stochiometric amounts of phosphoric acid and a polyhydric alcohol with a molecular weight of about 200 and a water soluble carrier therefor.

8. In a method according to claim 7 wherein said polyhydric alcohol is selected from the group consisting of sorbitol and mannitol.

9. In a method according to claim 8 wherein said polyhydric alcohol comprises sorbitol.

10. In a method according to claim 8 wherein said polyhydric alcohol comprises mannitol.

11. In a method according to claim 7, wherein said carrier is selected from the group consisting of water, an alcohol, a glycol and a glycol ether.

12. In a method according to claim 7 wherein said carrier comprises polyethylene glycol.

13. In a method of connecting electrical circuitry by soldering, wherein said circuitry contains surface oxides which must be removed therefrom, the improvement which comprises removing said surface oxides by contacting said circuitry to be soldered with an effective amount, to cause removal of said surface oxides, of an ester of phosphoric acid which consists essentially of the reaction product of stochiometric amounts of phosphoric acid and a polyhydric alcohol with a molecular weight of about 200.

14. In a method according to claim 13 wherein said polyhydric alcohol is selected from the group consisting of sorbitol and mannitol.

15. In a method according to claim 14 wherein said polyhydric alcohol comprises sorbitol.

16. In a method according to claim 14 wherein said polyhydric alcohol comprises mannitol.

17. Cored solder in which the core comprises a fluxing agent which consists essentially of an ester of phosphoric acid which is the reaction product of stochiometric amounts of phosphoric acid and a polyhydric alcohol with a molecular weight of about 200.

18. Cored solder according to claim 17 wherein said polyhydric alcohol is selected from the group consisting of sorbitol and mannitol.

19. Cored solder according to claim 18 wherein said polyhydric alcohol comprises sorbitol.

20. Cored solder according to claim 18 wherein said polyhydric alcohol comprises mannitol.

21. A composition according to claim 1 wherein the fluxing agent is 1 to 20 percent of the composition of fluxing agent and carrier.

22. A composition of claim 1 wherein the composition contains no acids.

* * * * *